United States Patent
Ono et al.

(10) Patent No.: US 8,454,074 B2
(45) Date of Patent: Jun. 4, 2013

(54) STRUCTURE OF INSTRUMENT PANEL PARTS

(75) Inventors: Toshiyuki Ono, Hamamatsu (JP); Gouki Ata, Hamamatsu (JP)

(73) Assignee: Suzuki Motor Corporation, Hamamatsu (JP)

( * ) Notice: Subject to any disclaimer, the term of this patent is extended or adjusted under 35 U.S.C. 154(b) by 0 days.

(21) Appl. No.: 13/304,593

(22) Filed: Nov. 25, 2011

(65) Prior Publication Data

US 2012/0139283 A1    Jun. 7, 2012

(30) Foreign Application Priority Data

Dec. 1, 2010   (JP) .................................. 2010-268736

(51) Int. Cl.
*B60R 7/06*    (2006.01)

(52) U.S. Cl.
USPC ..................................................... 296/37.12

(58) Field of Classification Search
USPC ............... 296/37.12, 193.02, 70, 72; 224/483
IPC ........................................................ B60R 7/06
See application file for complete search history.

(56) References Cited

U.S. PATENT DOCUMENTS 5,971,461 A * 10/1999 Vaishnav et al. ........... 296/37.12

FOREIGN PATENT DOCUMENTS

| JP | 2003-335179 | | 11/2003 |
|---|---|---|---|
| JP | 2005324668 | A * | 11/2005 |

* cited by examiner

*Primary Examiner* — Dennis Pedder
*Assistant Examiner* — Beverly Becker
(74) *Attorney, Agent, or Firm* — Silicon Valley Patent Group LLP

(57) ABSTRACT

A structure of instrument panel parts is proposed that is capable of increasing the support strength of a striker and the rigidity of an opening portion, and with which an enlarged storage volume can be achieved. The structure of an instrument panel has a storage portion arranged above a glove box. The structure includes an opening portion for a tray provided above the glove box; a tray constituting the storage portion, the tray being provided as a separate member from the instrument panel and being attached to the opening portion for the tray; a striker engaging a lock of the glove box; and a substantially flat plate-shaped striker reinforcement member supporting the striker. The lower side of the tray and the striker reinforcement member are fastened together to the instrument panel.

4 Claims, 6 Drawing Sheets

A-A

STRUCTURE OF INSTRUMENT PANEL PARTS

CROSS-REFERENCE TO RELATED APPLICATIONS

This application is based upon and claims the benefit of priority from the prior Japanese Patent Application No. 2010-268736, filed on Dec. 1, 2010, the entire contents of which are incorporated herein by reference.

BACKGROUND OF THE INVENTION

1. Field of the Invention

The present invention relates to a structure of instrument panel parts of an automobile, and more specifically to a structure for supporting a striker of a glove box.

2. Background of the Invention

Conventionally, a glove box is often provided in the instrument panel of an automobile. Furthermore, in recent years, in order to increase the on-board storage capabilities, a storage portion is sometimes provided above the glove box.

If the instrument panel is provided with a shelf-shaped storage portion, which is inserted toward the inside of the instrument panel, then, when trying to mold it in one piece with the instrument panel, it is necessary to pull out the core (projecting portion) of the die, so that there are such problems as that it is hard to make the bottom wall of the storage portion horizontal with respect to the car body, or that a large depth of the storage portion cannot be attained, and thus it is difficult to ensure a storage portion with sufficient capacity. Accordingly, as shown in Japanese Patent Laid-open Publication No. 2003-335179, arrangements are known, in which a tray made of a separate part constituting a storage portion is attached to an opening in the instrument panel.

In Japanese Patent Laid-open Publication No. 2003-335179, a configuration is proposed, in which a tray plate having a dish-shaped depression is fitted into an opening portion provided in an instrument panel, and a fixing member is provided that couples together and fixes a rear wall of the instrument panel and a rear wall of the tray plate. Thus, it can be prevented that, even when there is a collision of the vehicle, the tray plate comes off and flies through the car interior. Also, Japanese Patent Laid-open Publication No. 2003-335179 states that if a striker that engages a lock of the glove box is attached to a fixing member, then it is possible to have one fixing member serve the two purposes of engaging an engaging portion and fixing the tray plate, and it is possible to accomplish a reduction of the number of parts.

However, the fixing member (bracket) described in Japanese Patent Laid-open Publication No. 2003-335179 serves to couple and fix the rear wall of the instrument panel to the rear wall of the tray plate, so that it necessarily extends in the longitudinal direction of the vehicle. Therefore, it does not contribute to increasing the rigidity of the edge of the opening portion of the glove box or the storage portion, and there is the risk of creaking noises, buckling and displacements. In particular when a striker is attached, an impulsive load acts repeatedly when opening or closing the glove box, so that there was the risk that the attachment location of the fixing member is subject to deformations or breaking. Therefore, it is necessary to supplement the strength of the rim of the opening portion separately with an additional reinforcing part or rib structure, so that there is no reduction of the number of parts after all or the mold shape becomes complicated.

Furthermore, since the fixing member is attached to the rear wall of the tray plate and the glove box is arranged below that, a portion corresponding to the vertical width of the fixing member will be wasted as dead space. Accordingly, there is a demand for further increasing the efficiency with which the limited volume of the instrument panel is utilized.

It is thus an object of the present invention to propose a structure of instrument panel parts, with which the support strength of the striker and the rigidity of the opening portion is increased, and with which a larger storage volume can be achieved.

SUMMARY

In order to achieve this object, in one exemplary configuration of the present invention, a structure of instrument panel parts having a storage portion arranged above a glove box is provided, the structure comprising an opening portion provided above the glove box; a tray constituting the storage portion, the tray being provided as a separate part from the instrument panel and being attached to the opening portion; a striker engaging a lock of the glove box; and a plate-shaped striker reinforcement member supporting the striker; wherein the lower side of the tray and the striker reinforcement member are fastened together to the instrument panel.

With this configuration, it is possible to achieve a striker reinforcement member having a wide width extending across the width of the tray, and to increase the support strength of the striker. Moreover, it is possible to simultaneously increase the rigidity of the lower edge portion of the tray, the lower edge portion of the opening portion for the tray, and the upper edge portion of the opening portion for the glove box with the striker reinforcement member. Moreover, by fastening together the lower side of the tray and the striker reinforcement member, it is possible to narrow the distance between the tray and the glove box, so that it is possible to achieve an enlargement of the storage volume within the limited volume of the instrument panel.

It is preferable that a pin is provided in one of the instrument panel and the tray, and that the pin is inserted through the striker reinforcement member and a boss hole that is provided on the other of the instrument panel and the tray, positioning the tray and the striker reinforcement member with respect to the instrument panel. Thus, it is possible to position the striker reinforcement member and the tray at the same time when fastening them together to the instrument panel. Therefore, the positioning precision can be increased, and a reduction of the number of man-hours can be achieved. Consequently, it is possible to improve the positioning properties and the ease of assembly.

It is preferable that the side of the tray that is opposite to the instrument panel is fixed to a member constituting a portion of the car frame. Thus, the support rigidity of the tray can be improved, and hence, the support rigidity of the striker can be increased.

With the structure of instrument panel parts according to the present invention, it is possible to increase the support strength of the striker and the rigidity of the opening portion, and to achieve an enlargement of the storage volume.

BRIEF DESCRIPTION OF THE DRAWINGS

Embodiments of the invention will be described, by way of example only, with reference to the drawings.

DETAILED DESCRIPTION OF THE INVENTION

Figure 1:
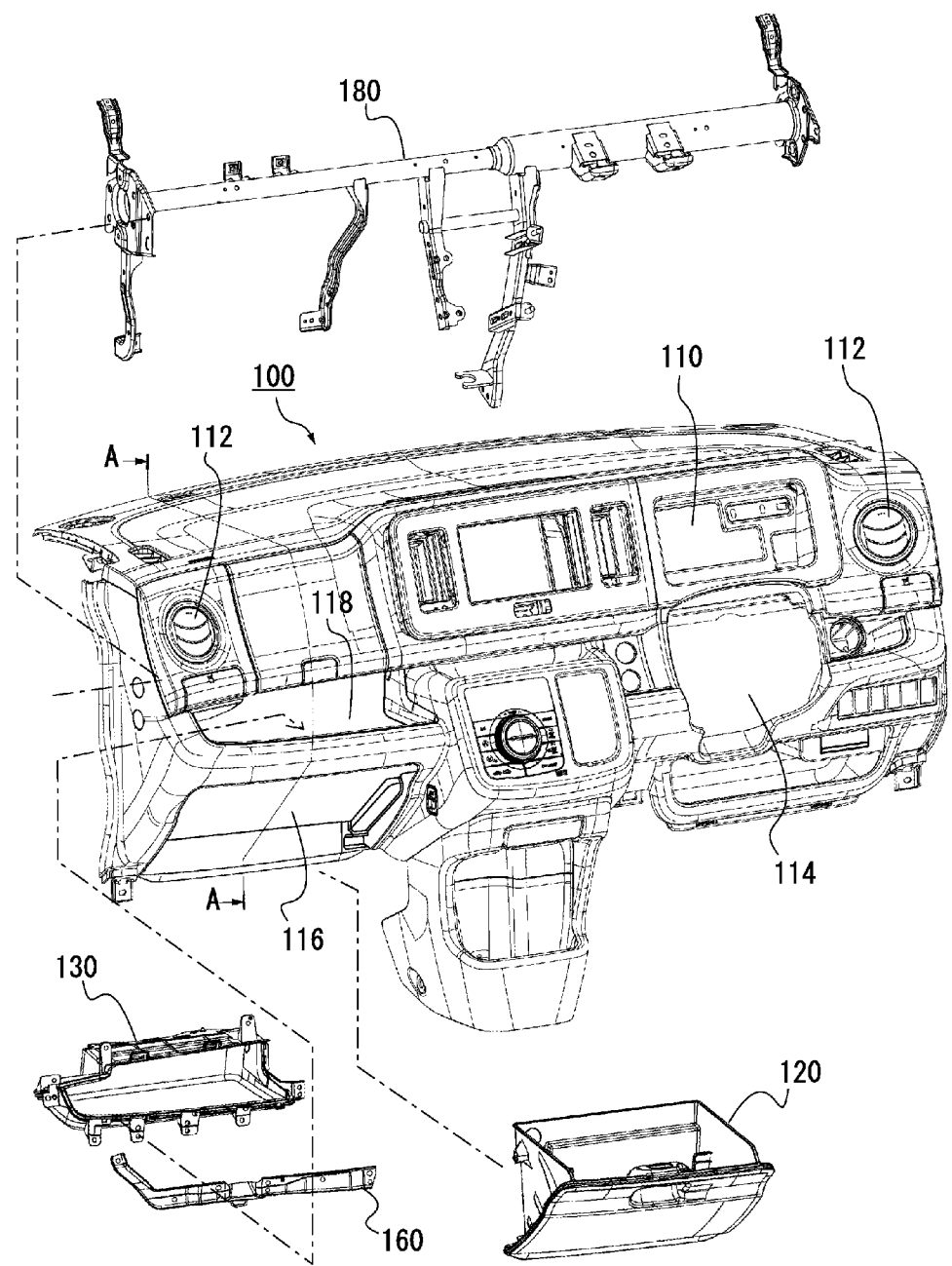
FIG. 1 is a diagram illustrating a structure of instrument panel parts according to an embodiment of the invention.

Referring to the accompanying drawings, the following is a detailed description of preferable embodiments of the present invention. All dimensions, materials and further specific numbers shown in the embodiments are given only by way of example, in order to aid the understanding of the invention, but are not meant to limit the present invention, unless this is explicitly stated so. It should be further noted throughout this specification and in the drawings, elements that have substantially the same functionality and/or structure are denoted by the same reference numerals, and their duplicate explanation has been omitted. Furthermore, elements that are not directly related to the present invention may not necessarily be shown in the figures.

FIG. 1 is a diagram illustrating a structure of instrument panel parts according to an embodiment of the present invention. An instrument panel 100 as shown in FIG. 1 is an interior part that separates the engine room from the passenger compartment. Moreover, the instrument panel 100 is provided with a dashboard panel 110, air-conditioning outlets 112, and an opening portion 114 for attaching a steering wheel unit, for example.

Moreover, near the knee position on the side of the front passenger seat, the instrument panel 100 is provided with an opening portion 116 for a glove box, to which a glove box 120 can be attached so that it can be opened/closed. A storage portion is configured by providing an opening portion 118 for a tray above the opening portion 116 for the glove box, and attaching a tray 130 to the inside thereof. As will be explained later, the lower side of the tray 130 and a striker reinforcement member 160 are fastened together to the instrument panel 100.

A steering wheel support member 180 that constitutes a portion of the car frame is attached to the inside of the instrument panel 100. The steering wheel support member 180 is made of steel, and spreads across the entire width of the instrument panel 100. A steering wheel unit (not shown in the drawings) is fixed to the steering wheel support member 180, and as explained further below, is fixed on the side of the instrument panel 100 that is opposite to the tray 130 (vehicle front side).

Figure 2:
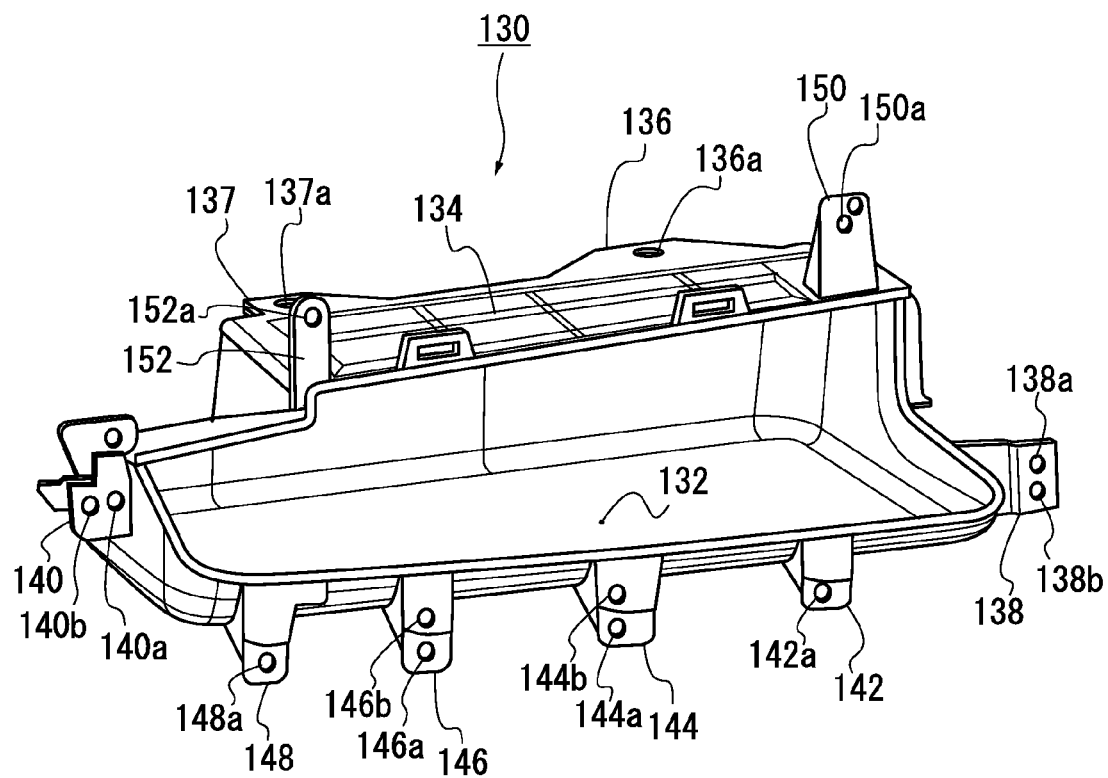
FIG. 2 is a diagram illustrating the tray.

FIG. 2 is a diagram illustrating the tray 130. The tray 130 is configured as a part that is separate to the instrument panel 100. The tray 130 is made of a plastic material, and is fabricated by injection molding. The tray 130 is made of a shelf portion 132 constituting a bottom wall of the storage portion, and a lid portion 134 that covers the upper surface on the inner side of the shelf portion 132. The shelf portion 132 and the lid portion 134 may be injection molded in one piece in an open state, with thin-walled hinge portions 136, 137 at their boundaries, and the lid portion 134 can be arranged to cover the shelf portion 132 by folding over the hinge portions 136, 137, as shown in FIG. 2. The opening portion constituted by the shelf portion 132 and the lid portion 134 substantially matches the circumferential edge of the opening portion 118 for the tray that is provided in the instrument panel 100.

Flanges 138 and 140 are arranged on both sides of the shelf portion 132, and fixed to the two sides of the opening portion 118 for the tray. The flange 138 is provided with a boss hole 138b and a screw hole 138a, and the flange 140 is provided with a boss hole 140b and a screw hole 140a.

Moreover, a plurality of tongue-shaped flanges 142, 144, 146 and 148 are provided on the lower side of the shelf portion 132, and are fixed to the lower edge of the opening portion 118 for the tray. Screw holes 142a, 144a, 146a and 148a are provided in the flanges, and boss holes 144b and 146b are provided in the middle two flanges 144 and 146, respectively. It should be noted that in the present embodiment, four flanges are provided on the lower side of the shelf portion 132, but there is no limitation to this number. Furthermore, it is also possible to provide a long continuous flange along the width direction of the tray 130.

Flanges 150 and 152 are provided at the edge of the lid portion 134, on the side of the instrument panel 100, and these flanges 150 and 152 are fixed to the upper edge of the opening portion 118 for the tray. These flanges are respectively provided with screw holes 150a and 152a.

The boss holes 138b, 140b, 144b and 146b are each positioned by inserting a pin into them that protrudes from the instrument panel 100. Tapping screws or the like are inserted into the screw holes 138a, 140a, 142a, 144a, 146a, 148a, 150a and 152a, and fastened to the instrument panel 100 (see FIG. 6).

Figure 5:
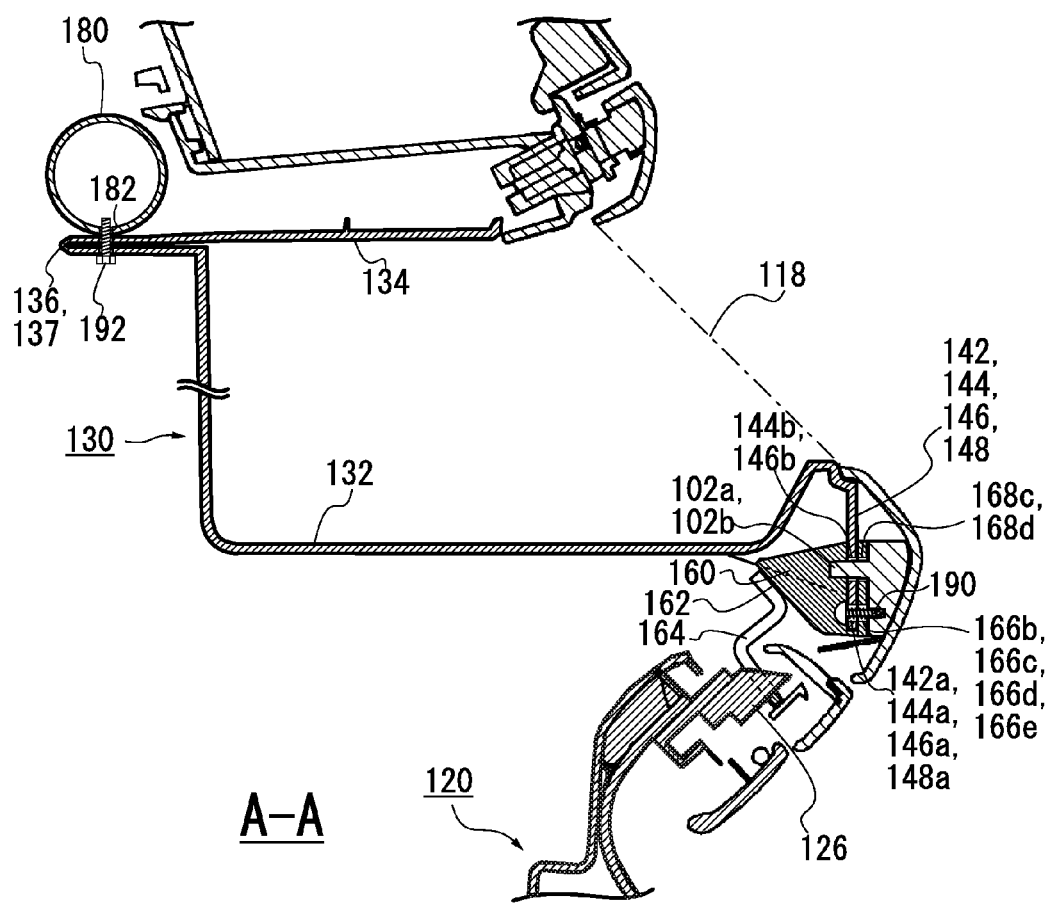
FIG. 5 is a cross-sectional view taken along the line A-A in FIG. 1.

The hinge portions 136 and 137 are provided with bolt holes 136a and 137a, and are fixed to the steering wheel support member 180 by bolts 192 (see FIG. 5). Note that the bolt holes 136a and 137a are provided symmetrically with respect to the folding line of the hinge portions 136 and 137, in both the shelf portion 132 and the lid portion 134.

Figure 3:
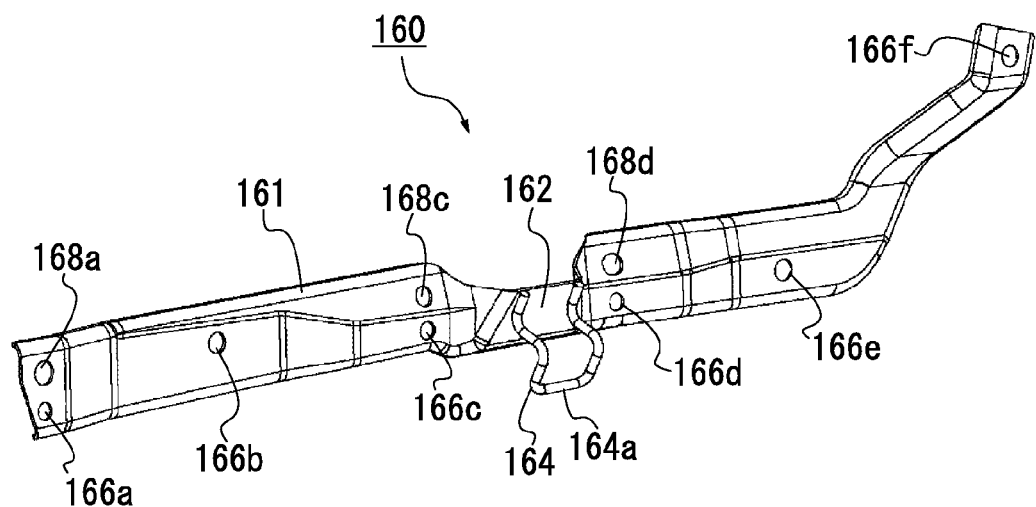
FIG. 3 is a diagram illustrating a striker reinforcement member.

FIG. 3 is a diagram illustrating a striker reinforcement member 160. The striker reinforcement member 160 is a plate-shaped member that is made of steel, and its main member 161 has a shape that follows the lower side of the opening portion 118 for the tray. And even though it is a generally flat plate-shaped member, the upper side and the lower side of the main member 161 are folded to the rear (towards the side opposite to the striker 164), forming a so-called C-shaped steel profile (C-channel). An oblique wall 162 receding in a downward direction is formed substantially in the middle of the main member 161, and a striker 164 that engages a lock 126 of the glove box 120 (see FIG. 4) is welded to this oblique wall 162. The striker 164 is configured by bending a wire member made of steel, and has a substantially horizontal engagement portion 164a that is positioned below the striker reinforcement member 160.

The striker reinforcement member 160 is provided with a plurality of screw holes 166a, 166b, 166c, 166d, 166e and 166f, and with a plurality of boss holes 168a, 168c and 168d.

Figure 4:
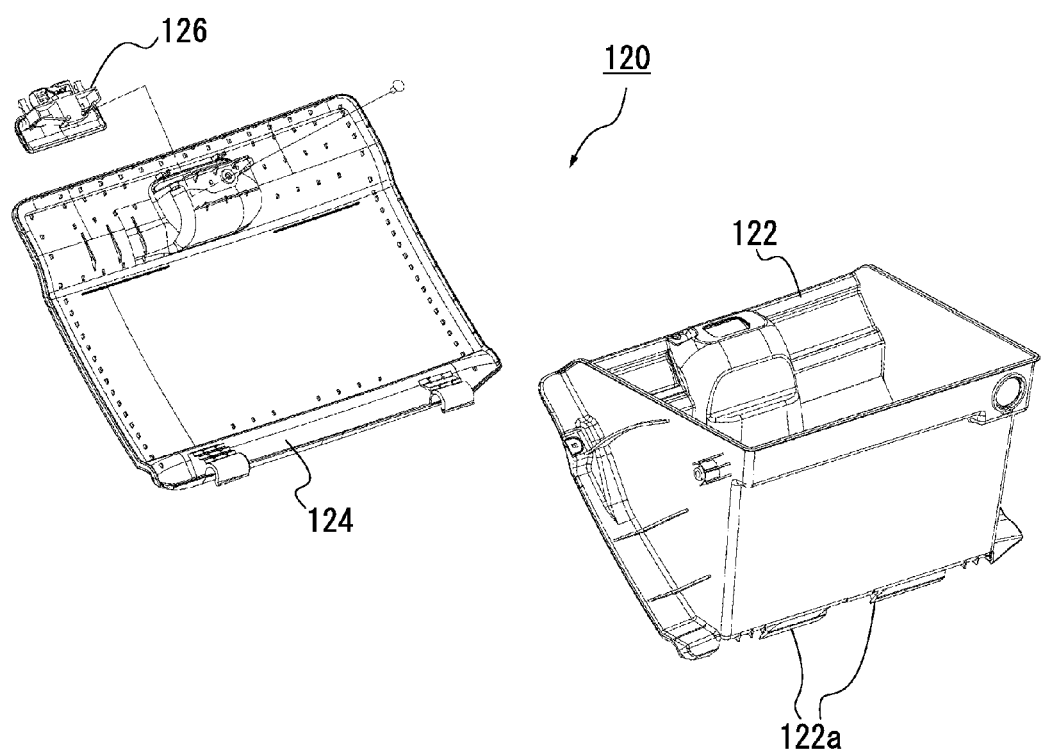
FIG. 4 is a diagram illustrating a glove box.

FIG. 4 is a diagram illustrating the glove box 120. The glove box 120 is made of a bucket 122 and a lid 124 constituting its front wall. The bucket 122 is sector-shaped when viewed from the side, and open to the top. By engaging the lower end of the opening portion 116 for the glove box with hooks 122a on the lower end of the glove box 120, the glove box 120 can be opened and closed with the hooks 122a as the pivot points. Moreover, by engaging a lock 126 provided at the upper end of the lid 124 with the striker 164, the glove box 120 can be closed securely shut.

Figure 6:
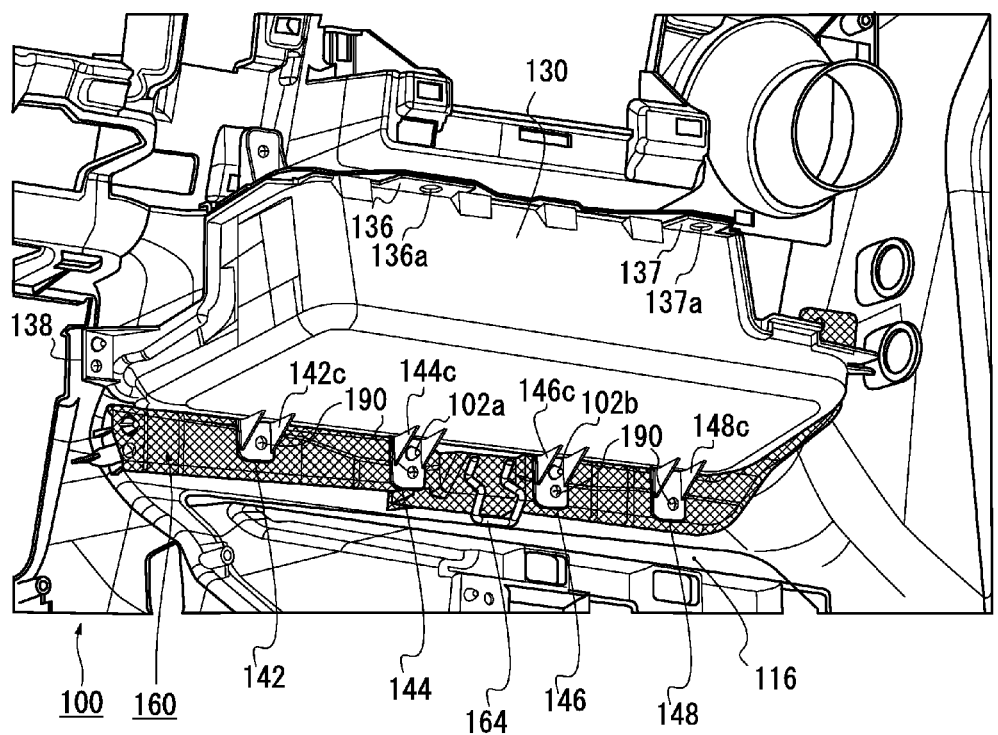
FIG. 6 is a rear view illustrating the assembly of the tray and the striker reinforcement member.

FIG. 5 is a cross-sectional view along the line A-A in FIG. 1, and FIG. 6 is a rear view illustrating the assembly of the tray 130 and the striker reinforcement member 160. Strictly speaking, FIG. 5 is not a cross-sectional view, as for example a screw 190 and a screw hole 142a, which should not actually be visible in this cross section, have been added for illustrative reasons. In FIG. 6, hatching has been added to the striker reinforcement member 160 for better identification. Moreover, the steering wheel support member 180 is not drawn in FIG. 6.

Here, the above-noted screw holes 142a, 144a, 146a and 148a of the tray 130 (see FIG. 2) and the screw holes 166b, 166c, 166d and 166e of the striker reinforcement member 160 (see FIG. 3) are arranged at corresponding positions. Similarly, the boss holes 144b and 146b of the tray 130 and the boss holes 168c and 168d of the striker reinforcement member 160 are arranged at corresponding positions.

First, as shown in FIGS. 5 and 6, pins 102a and 102b provided on the instrument panel 100 are inserted into the boss holes 168c and 168d of the striker reinforcement member 160 and the boss holes 144b and 146b of the tray 130, for positioning. Thus, it is possible to position the striker reinforcement member 160 and the tray 130 at the same time. Therefore, the positioning precision can be increased, and also the number of man-hours can be reduced. Furthermore, since the positioning precision of the joint between the lower side of the tray 130 and the opening portion 118 for the tray is improved, also the external appearance can be improved.

Next, the screw holes 142a, 144a, 146a and 148a on the lower side of the tray 130, and the screw holes 166b, 166c, 166d and 166e of the striker reinforcement member 160 are fastened together by screws 190, such as tapping screws, on the rear side at the lower edge of the opening portion 118 for the tray. Thus, the striker 164 extends downward, and can engage the lock 126 of the glove box 120.

With the above-described configuration, it is possible to use a wide striker reinforcement member 160 that extends across the width of the tray 130, and it is possible to improve the supporting strength of the striker 164. Moreover, with the striker reinforcement member 160, it is possible to simultaneously increase the rigidity of the lower edge portion of the tray 130, the lower edge portion of the opening portion 118 for the tray, and the upper edge portion of the opening portion 116 for the glove box. Moreover, by fastening together the lower side of the tray 130 and the striker reinforcement member 160, it is possible to narrow the distance between the tray 130 and the glove box 120, so that it is possible to achieve an enlargement of the storage volume within the limited volume of the instrument panel 100.

It is also possible to achieve an increase of the rigidity of the striker reinforcement member 160. That is to say, a force in rotation direction is always acting from the lock 126 of the glove box 120 on the striker 164, but the rotation is firmly impeded by the instrument panel 100 and the tray 130. Consequently, there is no risk that the striker reinforcement member 160 comes off or the location where it is attached deforms or breaks.

In particular, as shown in FIG. 6, the flanges 142, 144, 146 and 148 are made box-shaped by providing ribs 142c, 144c, 146c and 148c at both sides. Thus, the rigidity of the flanges 142, 144, 146 and 148 is increased, and the effect of stopping rotation of the striker reinforcement member 160 is enhanced.

Moreover, on the side of the tray 130 that is opposite to the instrument panel 100, the hinge portions 136 and 137 are fixed to the steering wheel support member 180, as shown in FIG. 5. Note that female threads 182 for accepting bolts 192 are cut into the steering wheel support member 180. Thus, it is possible to increase the support rigidity of the tray 130, and therefore to further improve the support rigidity of the striker 164.

In the foregoing, preferable embodiments of the present invention were explained with reference to the accompanying drawings, but needless to say, the present invention is not limited to these examples. The person skilled in the art will appreciate that various modifications and variations can be arrived at within the scope of the appended patent claims, and those modifications and variations should be understood to be included within the technical scope of the present invention.

As a structure of instrument panel parts of an automobile, the present invention can be utilized in particular as a structure for supporting the striker of a glove box.

What is claimed is:

1. A structure of instrument panel parts having a storage portion arranged above a glove box, the structure comprising:
   an opening portion provided above the glove box;
   a tray constituting the storage portion, the tray being provided as a separate part from the instrument panel and being attached to the opening portion;
   a striker engaging a lock of the glove box; and
   a plate-shaped striker reinforcement member extending across the width of the tray and supporting the striker;
   wherein the lower side of the tray and the striker reinforcement member are fastened together to the instrument panel.

2. A structure of instrument panel parts having a storage portion arranged above a glove box, the structure comprising:
   an opening portion provided above the glove box;
   a tray constituting the storage portion, the tray being provided as a separate part from the instrument panel and being attached to the opening portion;
   a striker engaging a lock of the glove box; and
   a plate-shaped striker reinforcement member extending across the width of the tray and supporting the striker;
   wherein:
   the lower side of the tray and the striker reinforcement member are fastened together to the instrument panel;
   a pin is provided in one of the instrument panel and the tray; and
   the pin is inserted through the striker reinforcement member and a boss hole that is provided on the other of the instrument panel and the tray, positioning the tray and the striker reinforcement member with respect to the instrument panel.

3. The structure of instrument panel parts according to claim 1, wherein the side of the tray that is opposite to the instrument panel is fixed to a member constituting a portion of a car frame.

4. The structure of instrument panel parts according to claim 2, wherein the side of the tray that is opposite to the instrument panel is fixed to a member constituting a portion of a car frame.

* * * * *